(12) United States Patent
Dilling

(10) Patent No.: US 7,891,274 B2
(45) Date of Patent: Feb. 22, 2011

(54) HIGH STRENGTH FASTENER SYSTEM

(75) Inventor: Gary Dilling, Gardiner, MA (US)

(73) Assignee: Phillips Screw Company, Burlington, MA (US)

( * ) Notice: Subject to any disclaimer, the term of this patent is extended or adjusted under 35 U.S.C. 154(b) by 175 days.

(21) Appl. No.: 12/231,459

(22) Filed: Sep. 3, 2008

(65) Prior Publication Data

US 2009/0104002 A1    Apr. 23, 2009

Related U.S. Application Data

(60) Provisional application No. 60/999,874, filed on Oct. 22, 2007.

(51) Int. Cl.
*B25B 15/00* (2006.01)
*B25B 13/48* (2006.01)
(52) U.S. Cl. .......................................... 81/436; 81/460
(58) Field of Classification Search .................... 81/436, 81/460; 411/403, 404
See application file for complete search history.

(56) References Cited

U.S. PATENT DOCUMENTS

| 4,269,246 | A | | 5/1981 | Larson | |
|---|---|---|---|---|---|
| 5,435,680 | A | * | 7/1995 | Schuster | 411/404 |
| 5,553,983 | A | * | 9/1996 | Shinjo | 411/404 |
| 5,957,645 | A | | 9/1999 | Stacy | |
| 6,234,914 | B1 | | 5/2001 | Stacy | |
| 6,367,358 | B1 | | 4/2002 | Stacy | |
| 6,685,412 | B2 | * | 2/2004 | Altarac et al. | 411/403 |

\* cited by examiner

*Primary Examiner*—David B Thomas
(74) *Attorney, Agent, or Firm*—Dickstein Shapiro LLP

(57) ABSTRACT

A fastener system is constructed wherein the installation and removal drive surfaces intersect an enlarged core diameter in a transitional surface that extends between the installation and removal surfaces of adjacent wings. The transitional surface has a concave form that conforms to the core diameter. The projections of the driver in the system are formed in a blunt shape.

16 Claims, 5 Drawing Sheets

| Drive Size | Original Driver Torque in-lbs | Drive Size | New Driver Torque in-lbs | Increased Torque |
|---|---|---|---|---|
| MT-000 | 7 | MTS-000 | 13 | 86% |
| MT-00 | 40 | MTS-00 | 60 | 50% |
| MT-0 | 105 | MTS-0 | 168 | 60% |
| MT-1 | 340 | MTS-1 | 480 | 41% |
| MT-2 | 643 | MTS-2 | 1008 | 57% |
| MT-3 | 919 | MTS-3 | 1513 | 65% |
| MT-4 | 1800 | MTS-4 | 2752 | 53% |
| MT-5 | 2200 | MTS-5 | 3190 | 45% |
| MT-6 | 3600 | MTS-6 | 5220 | 45% |
| MT-7 | 8000 | MTS-7 | 11600 | 45% |
| - | - | MTS-8 | 15535 | - |

\* = calculated torque

HIGH STRENGTH FASTENER SYSTEM

RELATED APPLICATIONS

This application claims priority from Provisional Application for Patent No. 60/999,874, filed Oct. 22, 2007.

BACKGROUND

1. Field

The disclosed embodiments generally relate to fastener systems including fastener, driver, method of manufacture and related tooling. In particular to fasteners having spiral drive and removal surfaces that enable high seating torques to be applied.

2. Brief Description of Related Developments

Fasteners having driver engageable surfaces that are, at least in part, defined by spiral segments have been used with good results. Fastener systems of this type are described in U.S. Pat. Nos. 5,957,645, 6,234,914, and 6,367,358 issued to Stacy and commonly owned with this application. The disclosures of these patents are incorporated herein by reference. The drive surfaces of the Stacy fastener system are constructed to maximize torque transmission, during installation and removal, while spreading the driving load over a broad driver/fastener interface. The thrust of these teachings is to enlarge the area of the drive surfaces.

More recently certain applications have been found that require the application of high seating torques to the fastener. Such torques may exceed the strength limits of the drivers used to seat the fastener. It is the purpose of this invention to provide an improved driver/fastener interface to increase the available seating torque characteristic of the fastener system.

The problem to which this application is directed, therefore, is to construct a drive fastener interface that increases the strength of the driver without significantly effecting the load distribution characteristics of the spiral interface surfaces.

SUMMARY

A fastener system is constructed having driver/fastener interface surfaces configured in the general shape of a segment of a spiral on both of the installation and removal surfaces. The recess and driver cross sectional shapes are constructed with an increased core diameter over the prior art spiral fastener system. This is accompanied by a shortening of the radial extension of the wing of both recess and driver cross sections beyond the core diameter. The wing cross section of the driver/recess is further modified by moving the installation and removal surfaces in a parallel manner to form a truncated wing shape with a blunt tip. The blunt tip is constructed to conform to a circle, concentric with the core, with a diameter larger than the core diameter. The drive surfaces are constructed to intersect the core diameter in a transitional surface between the wings that has a concave form conforming to the core diameter.

These changes have resulted in a startling increase in driver strength and a significant rise in seating torque capability for spiral drive fastener systems. The reduction in drive surface area is offset by the improved distribution characteristics from the drive surfaces to the core. To accomplish this the wing portion of the driver/recess cross section is constructed so that the ratio of the core radius to wing tip radius is greater than 0.55 and the transition surface between the wings is a concave segment of the core circumference. The ratio of the height of the wing cross section to its width is constructed to be approximately equal to or less than 0.5.

BRIEF DESCRIPTION OF THE DRAWINGS

The features of the subject matter of this application are explained in the following description, with reference to the accompanying drawings, in which.

DETAILED DESCRIPTION OF THE EMBODIMENTS

Figure 3:
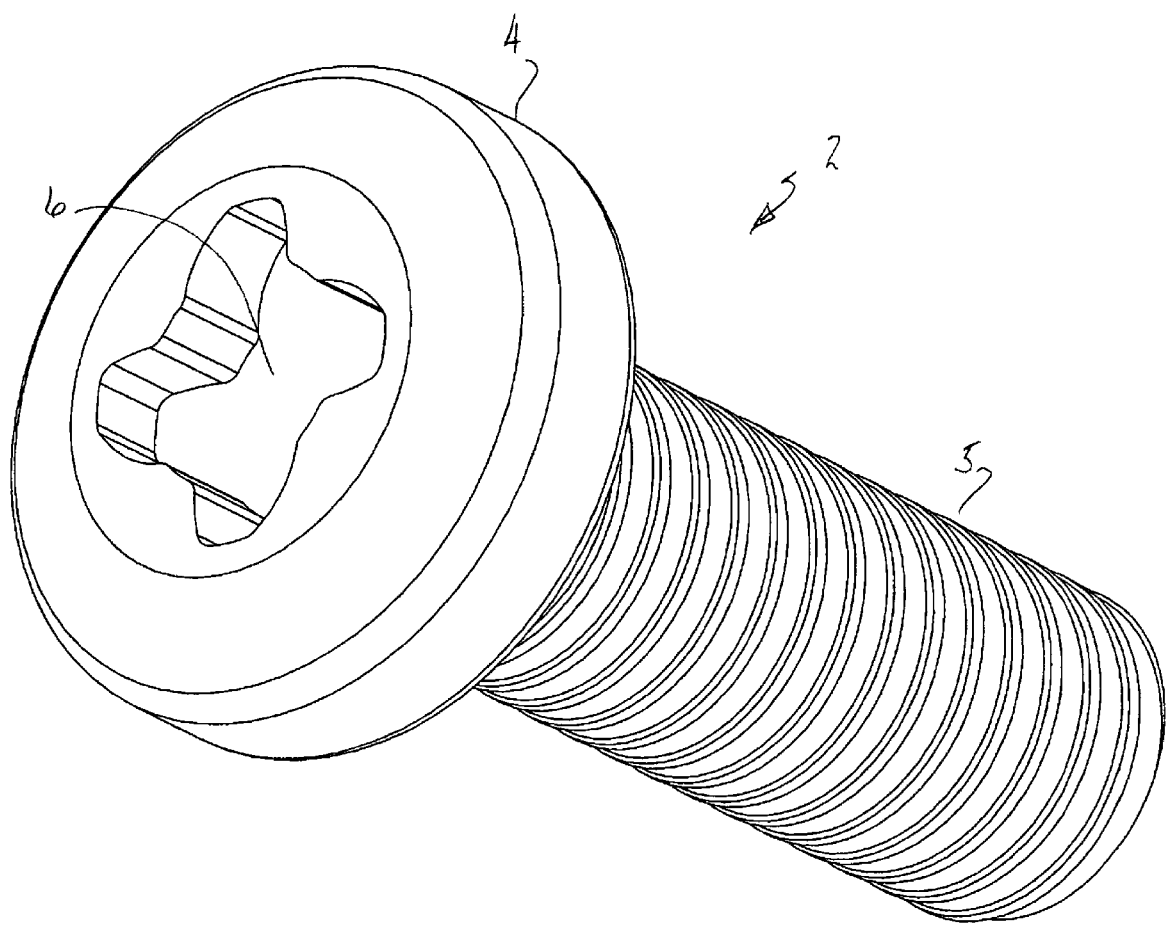
FIG. 3 is a perspective view of an embodiment of a spirally configured fastener illustrating the subject matter of this application.
Figures 4, 5:
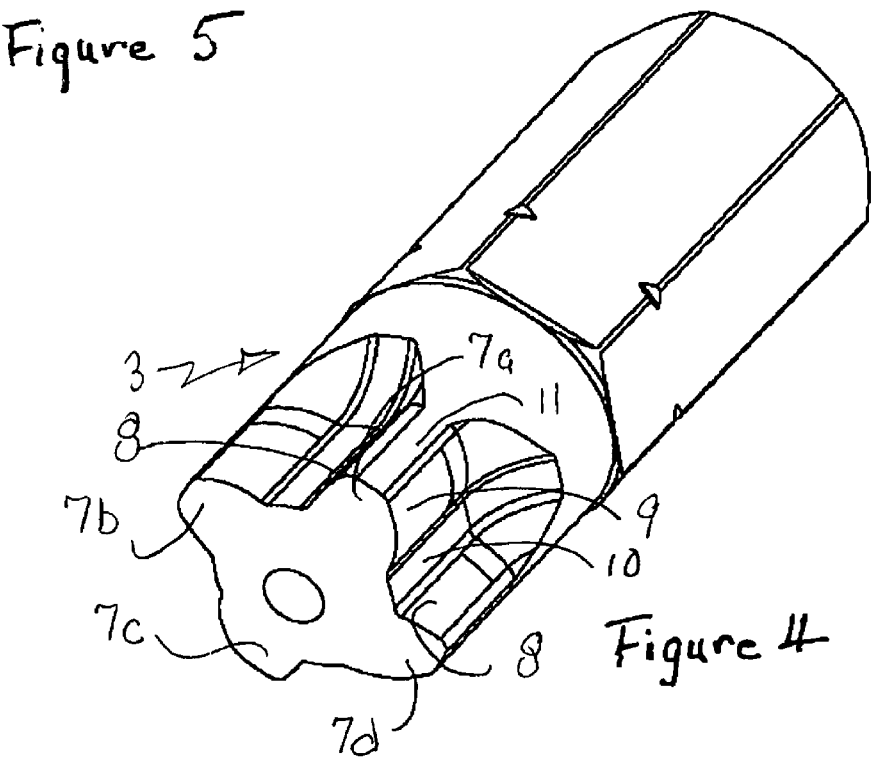
FIG. 4 is a perspective view of a spirally configured driver illustrating the subject matter of this application.
FIG. 5 is a chart showing the relative increase in torque capability of the fastener system of this application compared to prior art spirally configured fastener systems.

FIGS. 3 and 4 of this application illustrate, as an example, a fastener and driver bit of a fastener system having features of an embodiment of this application. Although the embodiments disclosed will be described with reference to the drawings, it should be understood that they may take many alternate forms.

A fastener system 1, according to the subject of this application, is shown in FIGS. 3 and 4 and consists of fastener 2 and driver bit 3. Fastener 2 is constructed having a head 4 and a threaded shank 5. A spirally configured recess 6 is formed in head 4. Driver bit 3 is constructed having spirally configured drive surfaces that mate with the corresponding surfaces of fastener recess 6. As shown in the example of FIG. 4, driver bit 3 utilizes a generally cruciform shape having wings 7a,b,c, and d. Similarly to prior art spirally configured fasteners, the overall shapes and number of wings may be varied from the example illustrated. Each of the wings have a substantially similar shape with an installation surface 8, a tip portion 11 and a removal surface 9 that define the wings 7. A transition surface 10 extends between the installation and removal surfaces of adjacent wings, such as wings 7a and 7b as shown in FIG. 4. The overall shape of the recess 6 and driver bit 3 is similar, except the bit 3 is smaller to provide a clearance between driver and fastener to promote engagement and removal of the driver bit 3 from the recess 6. In addition the driver bit installation and removal walls are slightly different from the corresponding recess walls so rotation of the bit will provide a full face to face engagement on both the removal and installation wall. As indicated above, the driver/fastener interface surfaces are configured in the general shape of a segment of a spiral on both of the installation and removal surfaces.

Figure 6:
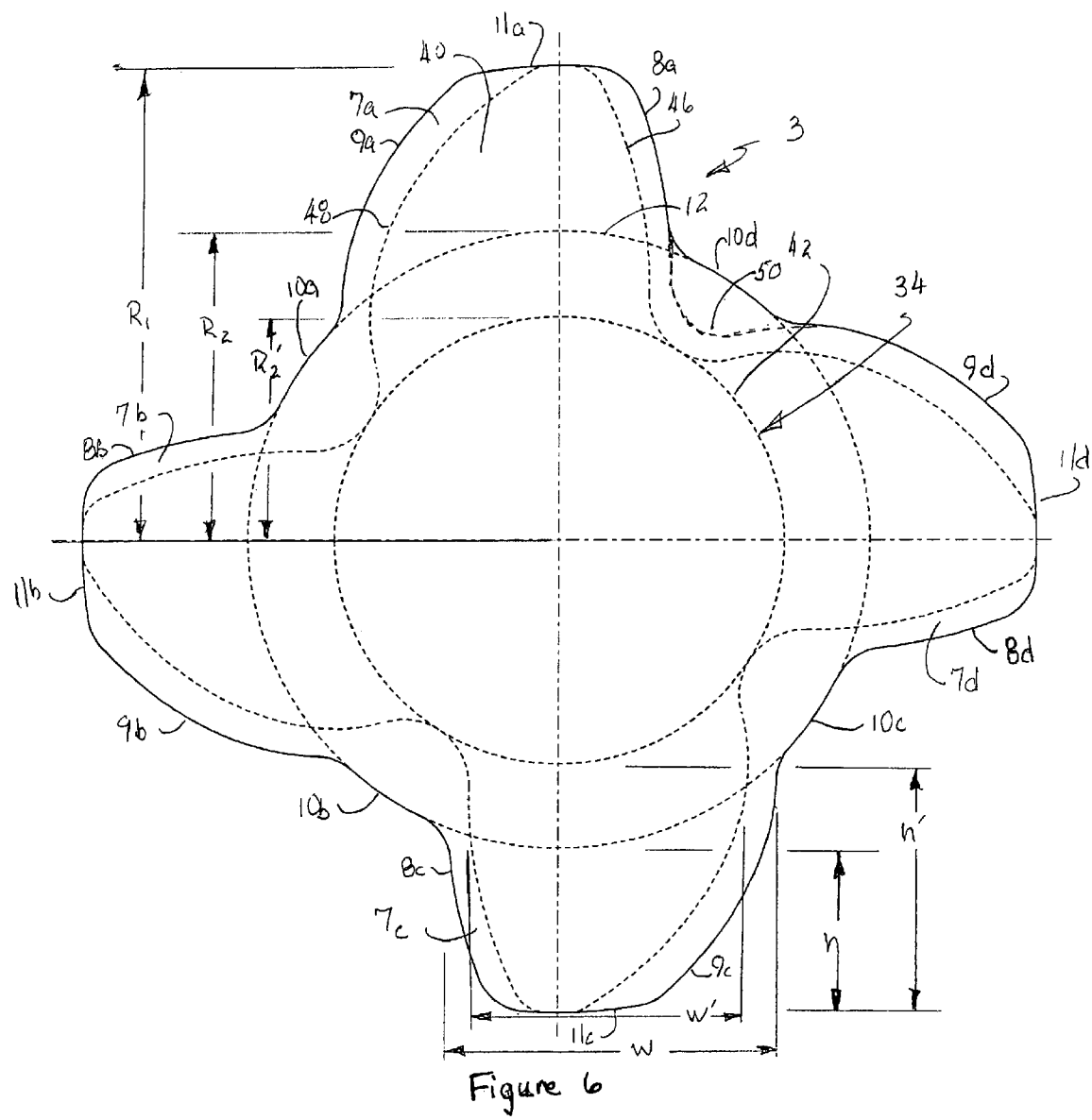
FIG. 6 is a cross sectional view of an embodiment of a fastener driver according to the subject matter of this application with a cross section of the prior art driver superimposed shown with dashed outline.

The details of the recess and driver bit shape are shown in FIG. 6. For simplicity only a cross sectional view of a driver is provided, it being understood that the recess is similarly shaped as shown in FIG. 3. Although the engagement surface of the fastener head 4 are shown to be recessed to receive a mating male configured driver, it is equally possible to provide the engagement surfaces as external surfaces of head 4 for engagement with a female configured driver, as shown in FIGS. 13 and b of the '358 patent incorporated herein by reference.

Figure 1:
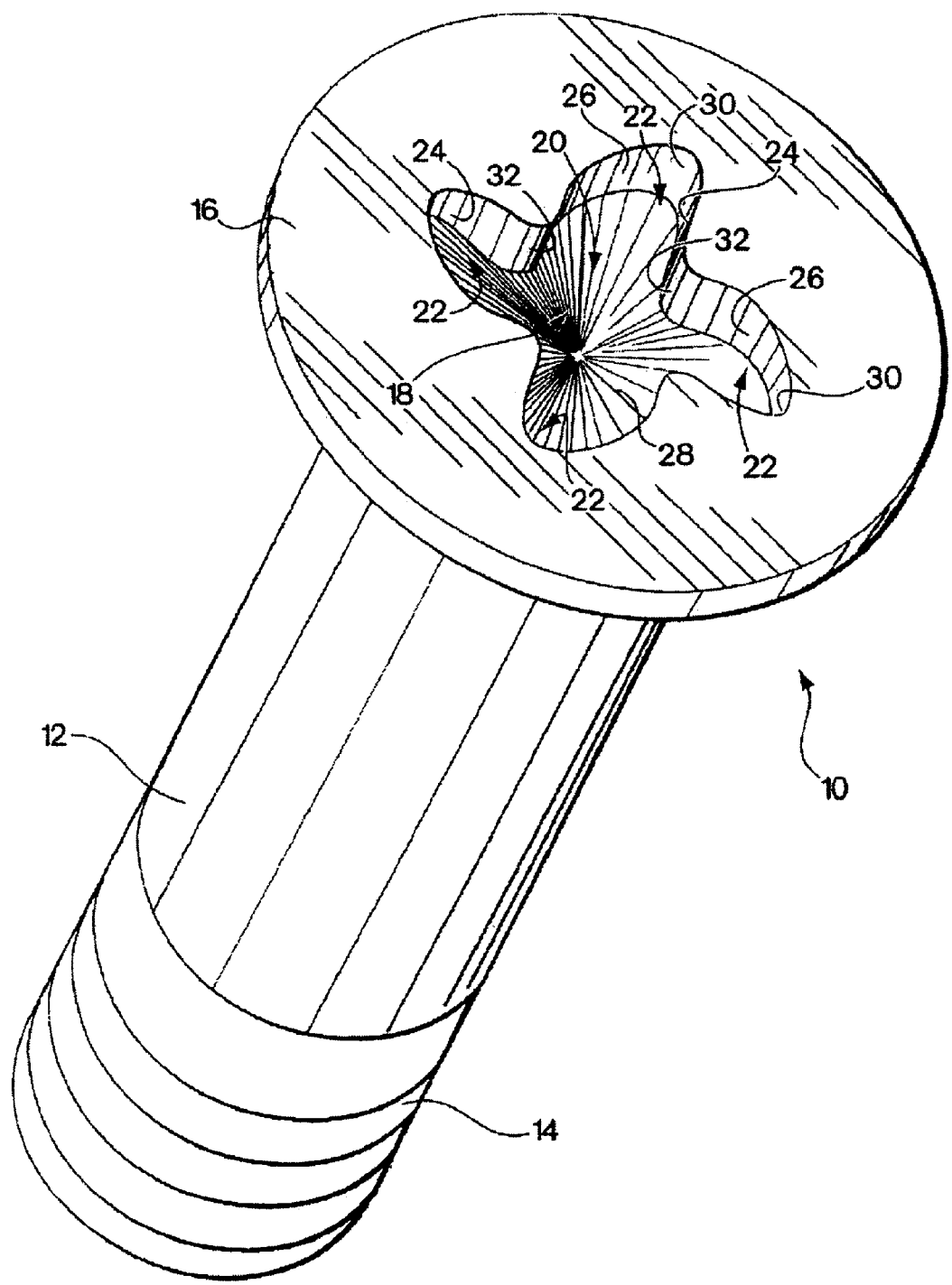
FIG. 1 is a perspective view of a fastener having spirally configured drive surfaces of the prior art.
Figure 2:
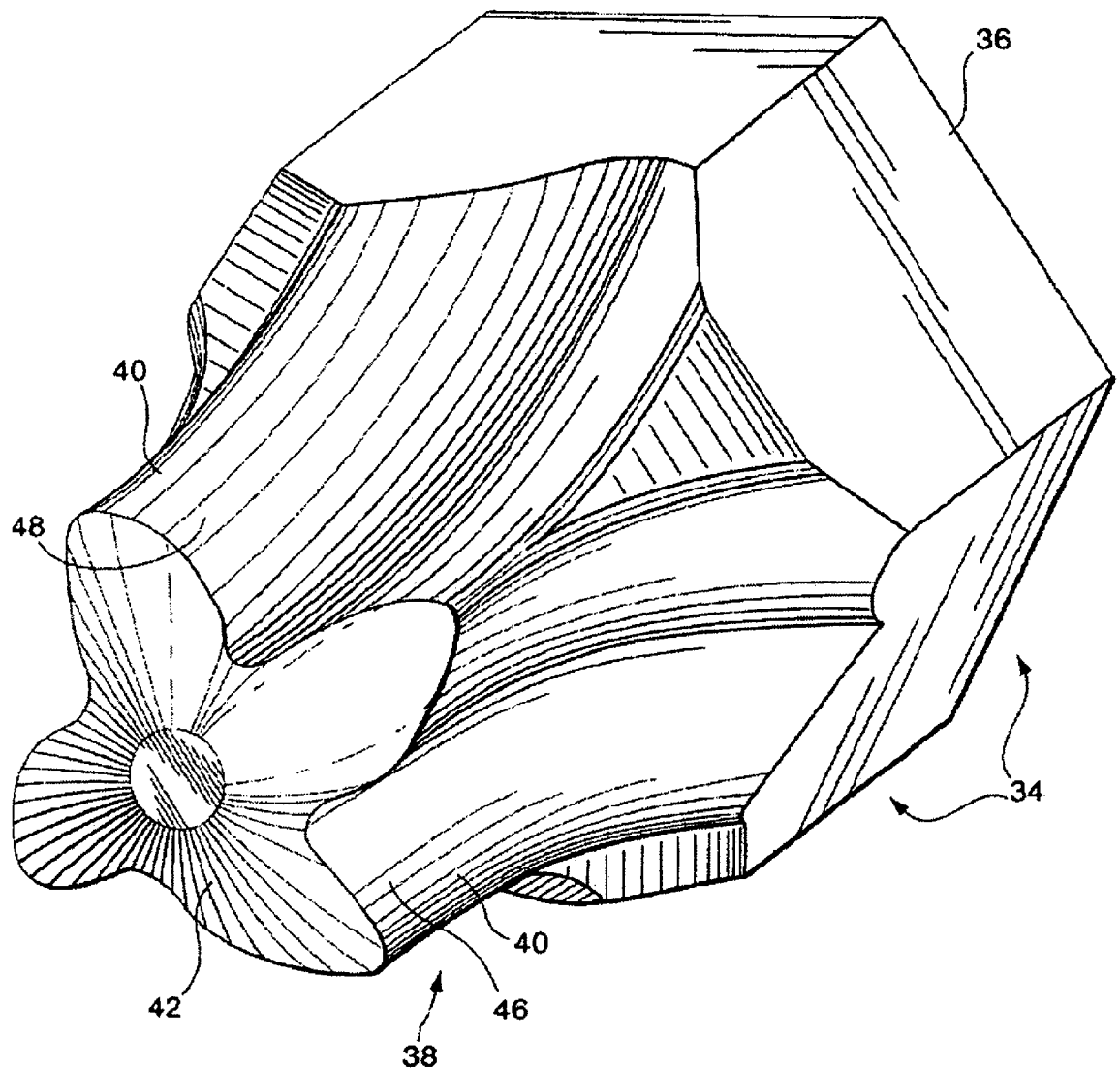
FIG. 2 is a perspective view of a driver having spirally configured drive surfaces of the prior art.

FIG. 6 illustrates a cross section of an embodiment of driver 3 with a cross section of a prior art driver 34 in phantom, as shown in FIG. 2. It is observed that the cross sectional shape of driver 3 is constructed with an increased core radius ($R_2$) over the prior art spiral driver 34 ($R_2'$). The overall radius $R_1$ remains unchanged, thereby requiring a shortening of the height h of wing 7 in order to accommodate the enlarged core radius $R_2$. This results in a reduced surface area for the driving surfaces with an anticipated deficit to performance. The cross section of wing 7 is further modified by moving the installation and removal surfaces 8 and 9 outward in a parallel manner to form a truncated wing shape with a blunt tip 11. The blunt tip 11 is constructed to conform to a segment of a circle, concentric with the core 12, having a diameter larger than the core diameter. The drive surfaces 8 and 9 are constructed to intersect the core diameter in a transitional surface 10 between adjacent wings, for example, wings 7a and 7d with transitional surface 10d. The transitional surface 10 has a concave form that conforms to the core diameter.

As shown in FIG. 6 a cross section of driver 3 is shown having wings or projections 7a,b,c,d. The wings are defined respectively by installation drive surfaces 8a,b,c,d, tip contours 11a,b,c,d, and removal drive surfaces 9a,b,c,d. Adjacent wings intersect the core circumference 12 in transitions surfaces 10a,b,c,d. For comparison, the prior art driver 34 is shown in phantom having wings 40 extending outward from a core with a radius ($R_2'$) and defined by installation drive surfaces 46 and removal drive surfaces 48.

Instead of a deficit in performance, these changes have resulted in a startling increase in driver strength and a significant rise in seating torque capability for spiral drive fastener systems. The reduction in drive surface area is offset by the improved distribution characteristics from the drive surfaces to the core. FIG. 5 is a chart of test results showing the results of bit strength tests performed on the high strength bit of the fastener system of this application and the same size bit of the prior art spirally configured fastener systems. The increased strength, represented in the chart of FIG. 5, is indicative of the significant advantage provided by the fastener system of this application.

The increased strength of the system and the increased seating torque, may be attributed to the recess and driver being constructed with a core diameter that is increased over the prior art spiral fastener system. It would have been logical to try to maintain the area of the drive surfaces by constructing the transition surface as a convex continuation of the installation and removal surfaces 7 and 8 similar to the prior art design as shown in FIG. 6 by phantom line 50. Instead according to subject matter of this application, the drive surfaces 8 and 9 are constructed to intersect the core diameter in a transitional surface 10 between the wings 7 that has a concave form conforming to the core diameter. This adds to core strength, but further truncates the wing cross section and reduces drive surface area. In addition, by truncating the outer tip of the wing cross section and moving the drive surfaces outward in parallel with the prior art configuration, the wing may be enlarged and formed with a blunt tip, the strength of the system maybe further increased. It is observed that the center of mass of the wing will also be moved outward, thereby effecting an improved load distribution.

This is accompanied by a shortening of the radial extension of the wing of both recess and driver cross sections beyond the core diameter. The wing cross section of the driver/recess is further modified by moving the installation and removal surfaces in a parallel manner to form a truncated wing shape with a blunt tip. The blunt tip is constructed to conform to a circle, concentric with the core, with a diameter larger than the core diameter.

To accomplish this the cross section of the wing portion of the driver 3 (and therefore also the wing portion of the recess 6) is truncated both outward from the core circumference 12 and inward from the tip 11. In this manner, the projections 7 are constructed so that the ratio of core radius $R_2$ to the wing tip radius $R_1$ is greater than 0.55 and the transition surface 10 between the wings 7 is a concave segment of the core circumference. Preferably the ratio of $R_2/R_1$ is in the range of 0.65 to 0.70. In addition the width w of the wings or projections 7a,b,c,d, is enlarged while maintaining the profile of the drive surfaces to be consistent with the prior fastener system. The ratio h/w of the height h of the wing cross section to its width w is constructed to be approximately equal to or less than 0.5. In comparison, referring to FIG. 6, the ratio $R'_2/R_1$ may be calculated to be approximately 0.46 and the ratio of prior art fastener systems (h'/w') may be calculated to be approximately 0.93. These modified dimensions have proven to provide a significant advantageous improvement in bit strength.

Although the subject matter of this application is discussed with reference to a fastener system having spirally configured drive surfaces, it is believed that the construction and method is equally applicable to other cruciform style fastener systems, in particular, a hexalobular style fastener system as described in U.S. Pat. No. 6,017,177 and ISO 10664.

In this manner a new and unique fastener system is presented that provides a startling improvement in strength characteristics with respect to the driver without a deficit to the overall performance of the fastener system.

It should be understood that the above description is only illustrative of the invention. Various alternatives and modifications can be devised by those skilled in the art with out departing from the invention. Accordingly, the present invention is intended to embrace all such alternatives, modifications and variances which fall with the scope of the appended claims.

The invention claimed is:

1. A fastener system comprising:
    a fastener having a head and a shank wherein the head is constructed having driver engageable surfaces and said driver engageable surfaces define multiple wings radially extending from a central core;
    a driver having a bit end constructed with mating surfaces for engagement with the driver engageable surfaces of the recess in the fastener head and said mating surfaces define multiple projections radially extending from a central core matching the wings;
    wherein each of said projections are constructed with a cross sectional shape comprising an installation surface, a tip portion and a removal surface that define the projection, and wherein each of the projections are connected by a transition surface extending between the installation and removal surfaces of adjacent projections and where the transition surface conforms to a circumference of the central core;
    wherein the cross sectional shape comprises a projection having a width and a height and the ratio of the projection height to the projection width is equal to or less than 0.5; and
    further wherein the driver engageable surfaces of the fastener head are constructed to receive the mating surfaces of the driver.

2. A fastener system according to claim 1 wherein the cross sectional shape comprises a central core having a first radius and a tip having a second radius and wherein the ratio of the first radius to the second radius is greater than 0.55.

3. A fastener system according to claim 2 wherein the ratio is greater than 0.65.

4. A fastener system according to claim 1 wherein the cross sectional shape comprises a central core having a first radius and a tip having a second radius and wherein the ratio of the first radius to the second radius is within the range of 0.65 to 0.70.

5. A fastener system according to claim 1 wherein the driver engageable surfaces are constructed in the shape of a spiral segment and said mating surfaces have a matching shape.

6. A fastener system, according to claim 1 wherein the projections are arranged in an hexalobular configuration.

7. A method of constructing a fastener system comprising:
forming a fastener having a head and a shank wherein the head is constructed having driver engageable surfaces and said driver engageable surfaces define multiple wings radially extending from a central core;
constructing a driver having a bit end having mating surfaces for engagement with the driver engageable surfaces of the fastener head and said mating surfaces define multiple projections radially extending from a central core matching the wings;
constructing each of said projections with a cross sectional shape comprising an installation surface, a tip portion and a removal surface that define the projection, and wherein each of the projections are connected by a transition surface extending between the installation and removal surfaces of adjacent projections and where the transition surface conforms to a circumference of the central core;
truncating each of the projections from the core outward and from the tip portion inward thereby forming each of the projections having a width and a height and the ratio of the projection height to the projection width is equal to or less than 0.5; and
forming the driver engageable surfaces of the fastener head to receive the mating surfaces of the driver.

8. The method according to claim 7 further comprising forming the central core having a first radius and the tip portion having a second radius and wherein the ratio of the first radius to the second radius is greater than 0.55.

9. The method according to claim 8 wherein the ratio is greater than 0.65.

10. The method according to claim 7 further comprising forming the central core having a first radius and the tip portion having a second radius and wherein the ratio of the first radius to the second radius is within the range of 0.65 to 0.70.

11. The method according to claim 7 wherein the driver engageable surfaces are constructed in the shape of a spiral segment and said mating surfaces have a matching shape.

12. The method according to claim 7 wherein the projections are arranged in an hexalobular configuration.

13. A fastener system comprising:
a fastener having a head and a shank wherein the head is constructed having driver engageable surfaces and said driver engageable surfaces define multiple wings radially extending from a central core;
a driver having a bit end constructed with mating surfaces for engagement with the driver engageable surfaces of the recess in the fastener head and said mating surfaces define multiple projections radially extending from a central core matching the wings;
wherein each of said projections are constructed with a cross sectional shape comprising an installation surface, a tip portion and a removal surface that define the projection, and wherein each of the projections are connected by a transition surface extending between the installation and removal surfaces of adjacent projections and where the transition surface conforms to a circumference of the central core;
wherein the driver engageable surfaces of the fastener head are constructed to receive the mating surfaces of the driver; and
further wherein the driver engageable surfaces are constructed in the shape of a spiral segment and said mating surfaces have a matching shape.

14. A method of constructing a fastener system comprising:
forming a fastener having a head and a shank wherein the head is constructed having driver engageable surfaces and said driver engageable surfaces define multiple wings radially extending from a central core;
constructing a driver having a bit end having mating surfaces for engagement with the driver engageable surfaces of the fastener head and said mating surfaces define multiple projections radially extending from a central core matching the wings;
constructing each of said projections with a cross sectional shape comprising an installation surface, a tip portion and a removal surface that define the projection, and wherein each of the projections are connected by a transition surface extending between the installation and removal surfaces of adjacent projections and where the transition surface conforms to a circumference of the central core;
forming the driver engageable surfaces of the fastener head to receive the mating surfaces of the driver; and
further wherein the driver engageable surfaces are constructed in the shape of a spiral segment and said mating surfaces have a matching shape.

15. A fastener system comprising:
a fastener having a head and a shank wherein the head is constructed having driver engageable surfaces and said driver engageable surfaces define multiple wings radially extending from a central core;
a driver having a bit end constructed with mating surfaces for engagement with the driver engageable surfaces of the recess in the fastener head and said mating surfaces define multiple projections radially extending from a central core matching the wings;
wherein each of said projections are constructed with a cross sectional shape comprising an installation surface, a tip portion and a removal surface that define the projection, and wherein each of the projections are connected by a transition surface extending between the installation and removal surfaces of adjacent projections and where the transition surface conforms to a concave circumference of the central core;
wherein the cross sectional shape comprises a central core having a first radius and a tip having a second radius and wherein the ratio of the first radius to the second radius is greater than 0.55; and
further wherein the driver engageable surfaces of the fastener head are constructed to receive the mating surfaces of the driver.

16. A method of constructing a fastener system comprising:
forming a fastener having a head and a shank wherein the head is constructed having driver engageable surfaces and said driver engageable surfaces define multiple wings radially extending from a central core;

constructing a driver having a bit end having mating surfaces for engagement with the driver engageable surfaces of the fastener head and said mating surfaces define multiple projections radially extending from a central core matching the wings;

constructing each of said projections with a cross sectional shape comprising an installation surface, a tip portion and a removal surface that define the projection, and wherein each of the projections are connected by a transition surface extending between the installation and removal surfaces of adjacent projections and where the transition surface conforms to a concave circumference of the central core;

forming the central core having a first radius and the tip portion having a second radius and wherein the ratio of the first radius to the second radius is greater than 0.55; and forming the driver engageable surfaces of the fastener head to receive the mating surfaces of the driver.

* * * * *